United States Patent Office 2,987,955
Patented June 13, 1961

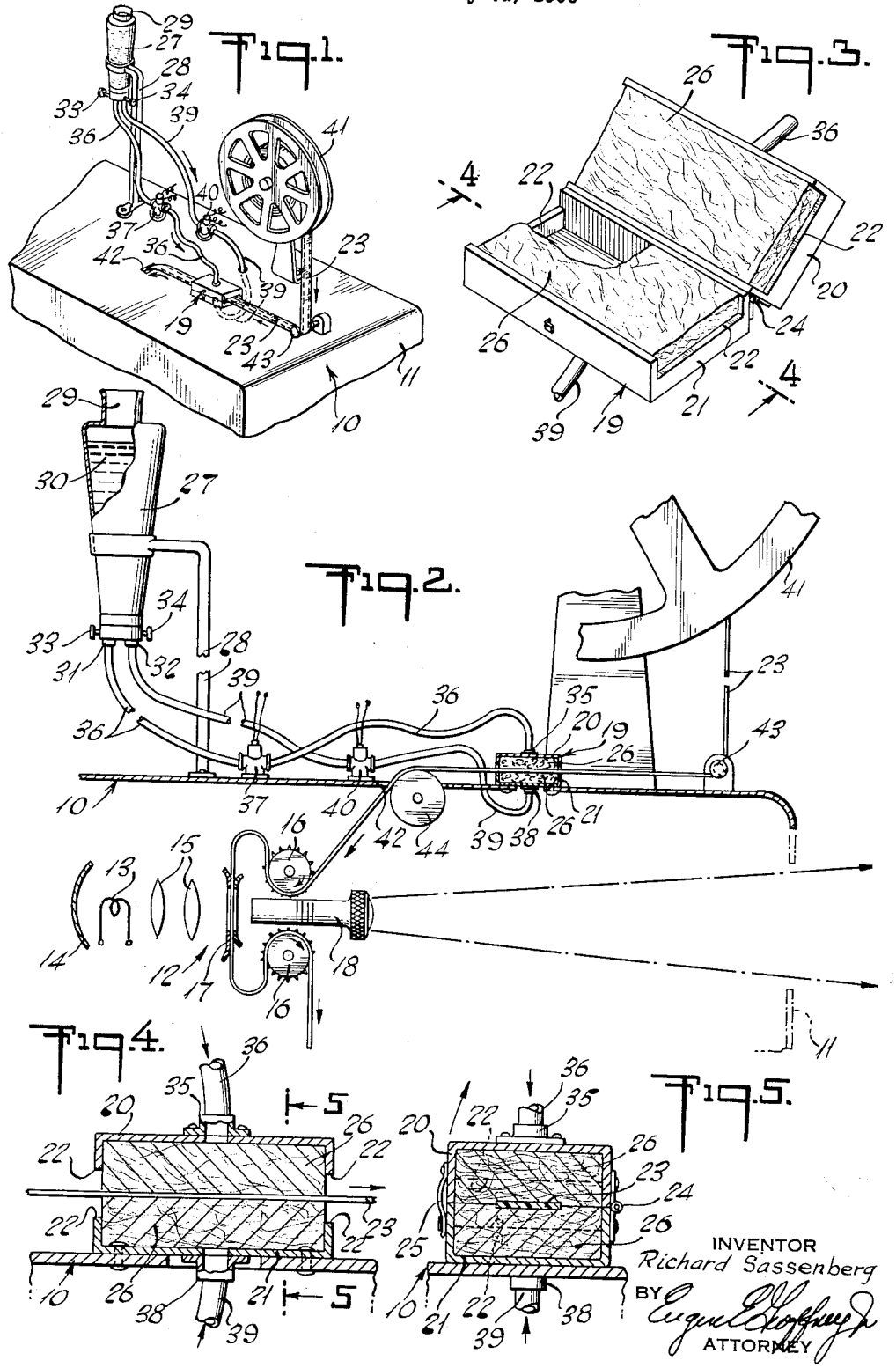

2,987,955
APPARATUS FOR TREATING MOTION PICTURE FILM
Richard Sassenberg, 905 Palmer Ave., Mamaroneck, N.Y.
Filed May 31, 1956, Ser. No. 588,287
2 Claims. (Cl. 88—17)

This invention relates to the projection of images carried by a transparent or translucent film material and more specifically to an improved method and apparatus for projecting film, and particularly motion picture film that will enable the production of clearer and brighter images.

In the projection and handling of film and particularly motion picture film, dust and other foreign matter that may accumulate on the film itself as well as in the projection apparatus often mars and scratches it. These scratches and other surface defects are readily apparent on the projected image and not only constitute a source of annoyance to the viewer but often obliterate or obscure much of the detail of the image. Furthermore, in the projection of film the quantity of light that can be projected through the film is limited by the rate of generation of heat. Even when the quantity of light is limited to prevent damage to the film, it nevertheless tends to warp the film with the result that it is difficult to maintain sharp focus over the area of the image.

Accordingly, one object of the invention resides in the provision of an improved apparatus for projecting film that will substantially reduce if not entirely eliminate images of scratches and other film deformations during projection. Actual tests have indicated that older films can be used to produce images substantially as clear and distinct as new films so that the useful life of a film is greatly extended. This is particularly important in the commercial motion picture field since the number of copies of a film for direct display in theaters and indirect display on television can be materially reduced.

Another object of the invention resides in an improved apparatus for projecting motion pictures that will not only remove or obliterate images of film imperfections such as scratches and the like, but at the same time will enable the use of a materially brighter source for projection without damaging the film itself. While this advantage is of importance in conventional 16 mm. and 35 mm. projection, it is of particular importance in the case of wide screen systems which requires a considerably increased light intensity in order to obtain a satisfactory illumination over the surface of the wide screen.

Still another object of the invention is an improved apparatus for cleaning and protecting motion picture film during the course of projection. The removal of dust and dirt from the film before projection prevents mechanical damage to the film and at the same time the film is protected from the intense heat to which it is subjected during the projection process.

A further object of the invention resides in an improved apparatus for treating and protecting motion picture film in the course of projection to produce a clear clean picture substantially free of distracting images of physical scratches and other deformation that may be on the film itself.

A still further object of the invention resides in the provision of improved film projecting apparatus for cleaning and treating motion picture film to produce a clearer, cleaner picture.

A still further object of the invention resides in an improved attachment for motion picture projectors for cleaning and treating motion picture film to provide a clean, clear projected image substantially free of images of scratches and the like that may be carried by the film itself.

The above and other objects and advantages of the invention will become more apparent from the following description and accompanying drawings forming part of the application.

In the drawings:

FIG. 1 is a perspective view of a fragmentary part of a motion picture projector and illustrating one embodiment of the invention;

FIG. 2 is a side elevation of apparatus in accordance with the invention, the optical projecting apparatus being illustrated in diagrammatic form;

FIG. 3 is a perspective view of an applicator for use with the embodiment of the invention shown in FIGS. 1 and 2;

FIG. 4 is a cross sectional view of the applicator shown in FIG. 3 and taken along the line 4—4 thereof; and FIG. 5 is a cross sectional view of the applicator of FIGS. 3 and 4 taken along the line 5—5 of FIG. 4.

As pointed out above the projection of images carried on relatively thin films has presented a substantial problem since most film is of a relatively soft pliable material that is easily scratched or marred. This is particularly so in the case of conventional photographic film such as motion picture film and the like. In the case of motion picture film, dust and dirt particles in the projector or on the film mar and scratch the film itself and these scratches show up in the projected image as long streaks across the surface of the image. Scratching and marring of the film in this way definitely limits the life of the film and new copies must constantly be made in order to maintain good picture quality. In many cases, however, and particularly with old film, it is not possible to procure new copies of the film and it has been found that many old motion picture films cannot be used for this reason.

This problem has been particularly evident in television since many of the old films have been used for this purpose. Very often a film that is badly scratched and marred cannot be used and new copies are either not available or are available only at an excessive cost.

Another problem in the projection of film is the difficulty of projecting light of sufficient intensity through the film to attain the desired screen illumination without damaging the film. This is particularly the case with wide screen motion pictures even though the area of the frames has been increased in order to obtain improved illumination.

It has been found that with the invention, badly scratched and marred films can be used for direct projection on a screen or for television transmissions with little or no evidence of the scratches or other deformations on the film itself. Moreover, through an improved treatment of the film it has been found that the film when treated in accordance with the invention can be subjected to materially increased light intensities without encountering film damage. Thus the invention is useful for not only improving the quality and clarity of old films but at the same time will provide additional protection for all films.

These advantages are attained through the application of a liquid coating to a film in the course of projection and immediately prior to the actual projection. The film is coated with a relatively volatile liquid such as perchlorethylene that will remain on the film itself at least during the actual projection. The selection of a liquid is determined by its rate of evaporation and the rate at which the film moves through the projector. It has been found that perchlorethylene and similar liquids work very satisfactorily and both remove the effect of scratches on the film and effect substantial cooling. Cooling of the film is accomplished by evaporation that is initiated immediately after application of the liquid to the film and continues during the projection of each frame. At the same time the coating of liquid on the surface of the film, at least part of which remains until after projection, fills the scratches and deformations in the film so that a clear image undistorted by scratches and other blemishes on the film will be produced. Actual tests with this invention have indicated not only the elimination of scratches and other defects from the reproduced image but a marked improvement in the clarity and brightness of the image being projected.

Referring now to the drawings, illustrating one embodiment of the invention, a conventional projector is generally denoted by the numeral 10 and includes an outer housing 11 and film projecting apparatus 12. The projecting appraatus may include a suitable light source 13, a reflector 14, suitable condensing lenses 15, film driving sprockets 16, framing means 17 and an objective lens 18. In addition the projector may also embody suitable heat baffles in conneciton with the condensing lenses 15 and a blower for cooling the film during the projection.

The application of a liquid that will function to coat or wet the film may be accomplished in any desired way, though it is preferred to use a liquid applicator that will not only coat the film but will also clean the film during the coating process. The preferred liquid applicator is denoted in the drawings by the numeral 19 and includes a rectangularly shaped housing having upper and lower portions 20 and 21, respectively. The end walls of the upper and lower portions are cut away as shown in 22 to provide openings through which the film 23 may pass during projection. The upper and lower portions of the housing are preferably connected one to the other by hinges 24 and are held in a closed position by a suitable latch 25.

Each half of the housing 19 is filled with a resilient absorbent material 26 such as a natural or synthetic sponge, felt or other similar material that will not of itself scratch or mar the film 23.

The liquid to be applied to the film is contained in a suitable reservoir such as the jar 27 which in this embodiment of the invention is supported above the upper surface of the projector housing 11 by means of a suitable stand 28. The upper end of the jar or container 27 has an opening 29 for replenishing the liquid 30 therein during the course of operation of the projector 10. The lower end of the container 27 is provided with a pair of outlets 31 and 32, each having a metering valve 33 and 34. The outlet 31 is connected to an opening 35 in the housing part 20 by means of rubber or other suitable tubing 36 and an electrically operated valve 37. The outlet 32 is similarly connected to the inlet 38 in the housing part 21 by means of the tubing 49 and the valve 40.

For best results the applicator 19 is preferably arranged to apply the liquid coating to the film just prior to its engagement with the first feeding sprocket 16. It is preferable to select a liquid having a rate of evaporation so that a coating of the liquid will remain on the film as it passes the frame member 17 and the liquid will completely evaporate by the time the film is wound on the take-up reel. Perchlorethylene has been found to meet these requirements. While this liquid has a drying time of about seven seconds, the rate of evaporation is materially increased by reason of the heat of projection. Other liquids may of course be used and separate heating devices employed if desired to insure complete evaporation before winding the projected film on the take-up reel.

In the illustrated embodiment of the invention the feeding reel 41 holding the film 23 is mounted on top of the projector housing 11 and is displaced from the film entrance opening 42 a distance sufficient to permit the installation of the applicator 19. The applicator is secured to the upper surface of the projector housing 11 and the film is fed about an idling roller 43, through the applicator 19 and then over a guide roller 44 to the first sprocket 16. The film then passes through the projecting apparatus in the usual manner and is wound upon a suitable take-up reel.

It has been found that the flow of liquid to the absorbent material 26 within the applicator 19 can be easily governed by suitable needle valves 33 and 34 to apply the desired amount of liquid to the film and at the same time prevent leakage from the sides of the applicator. In order to obtain automatic control of the supply of liquid, the electrically operated valves 37 and 40 may be connected for operation simultaneously with the driving means for the projector 12. If desired the valves 37 and 40 can be manually operated.

While it has been found that in normal projection operations that perchlorethylene either alone or with other liquids serves as an excellent coating material and functions both to cover the scratches or other deformations on the film during projection as well as cooling, it is apparent that any suitable liquid that will wet the film may also be used. It is important, however, that evaporation of the liquid will not leave a residue on the film and that the liquid will not attack, cloud or weaken the film in any way. In certain cases water may suffice for this purpose though its rate of evaporation is relatively slow and with certain types of film materials it may be difficult to secure a uniform coating.

The applicator in addition to coating the film 23 also serves to clean the film and remove all dust, dirt and other foreign particles. As a result the projector will remain cleaner and the possibility of further damage to the film is materially reduced.

The illustrated embodiment of the invention has been arranged for mounting on the top side of a motion picture projector. If desired, however, it may be provided as as separate attachment or the projector may be arranged to accommodate the applicator 19 and the liquid supply and control mechanism within the projector housing itself.

While only one embodiment of the invention has been shown and described, it is apparent that modifications, alterations and changes may be made without departing from the true scope and spirit thereof.

What is claimed is:

1. An applicator for applying a uniform liquid coating to motion picture film comprising a pair of cooperating housing parts, each housing part having a base, a pair of side walls extending outwardly from a pair of opposite edges of the base for retaining a pad therein and minimizing evaporation of liquid carried by the pad, said pads being formed of a material such as felt which just fills the compartment formed by said base and retaining means, the outer surface of each pad terminating substantially in the plane of the outer edges of the side walls of its associated housing part, means for holding the outer edges of the side walls of each housing part in firm abutting relationship with the outer surfaces of the pads in just touching engagement one with the other, and tubular means extending through each housing part for feeding liquid to said pads.

2. An applicator for applying a uniform coating of a liquid containing perchlorethylene to motion picture film comprising a pair of cooperating housing parts, an absorbent pad carried by each housing part, each housing part having a base and means including a pair of side walls extending outwardly from a pair of opposite edges of the base for retaining a pad therein and minimizing evaporation of liquid carried by the pad, said pads being formed of a material such as felt which just fills the compartment formed by said base and retaining means, the outer surface of each pad terminating substantially in the plane of the outer edges of the side walls of its associated housing part, means for holding the outer edges of the side walls of each housing part in form abutting relationship with the outer surfaces of the pads in just touching engagement one with the other, and tubular means extending through each housing part for feeding a liquid containing perchlorethylene to said pads.

References Cited in the file of this patent

UNITED STATES PATENTS

| | | |
|---|---|---|
| 1,208,664 | Russak et al. | Dec. 12, 1916 |
| 1,257,682 | Davis | Feb. 26, 1918 |
| 1,273,928 | Rosenfeld | July 30, 1918 |
| 1,581,198 | Gramsa | Apr. 20, 1926 |
| 1,926,981 | Gould | Sept. 12, 1933 |
| 1,927,284 | Howell | Sept. 19, 1933 |
| 2,073,538 | McNabb | Mar. 9, 1937 |
| 2,117,828 | Soman | May 17, 1938 |
| 2,408,438 | Mills | Oct. 1, 1946 |
| 2,418,109 | Sconce | Apr. 1, 1947 |
| 2,799,716 | Brummet | July 16, 1947 |

FOREIGN PATENTS

| | | |
|---|---|---|
| 848,908 | Germany | Sept. 8, 1952 |